Dec. 1, 1925.
A. CAMPBELL
1,563,554
TANK VALVE MECHANISM
Filed Sept. 12, 1924 3 Sheets-Sheet 1
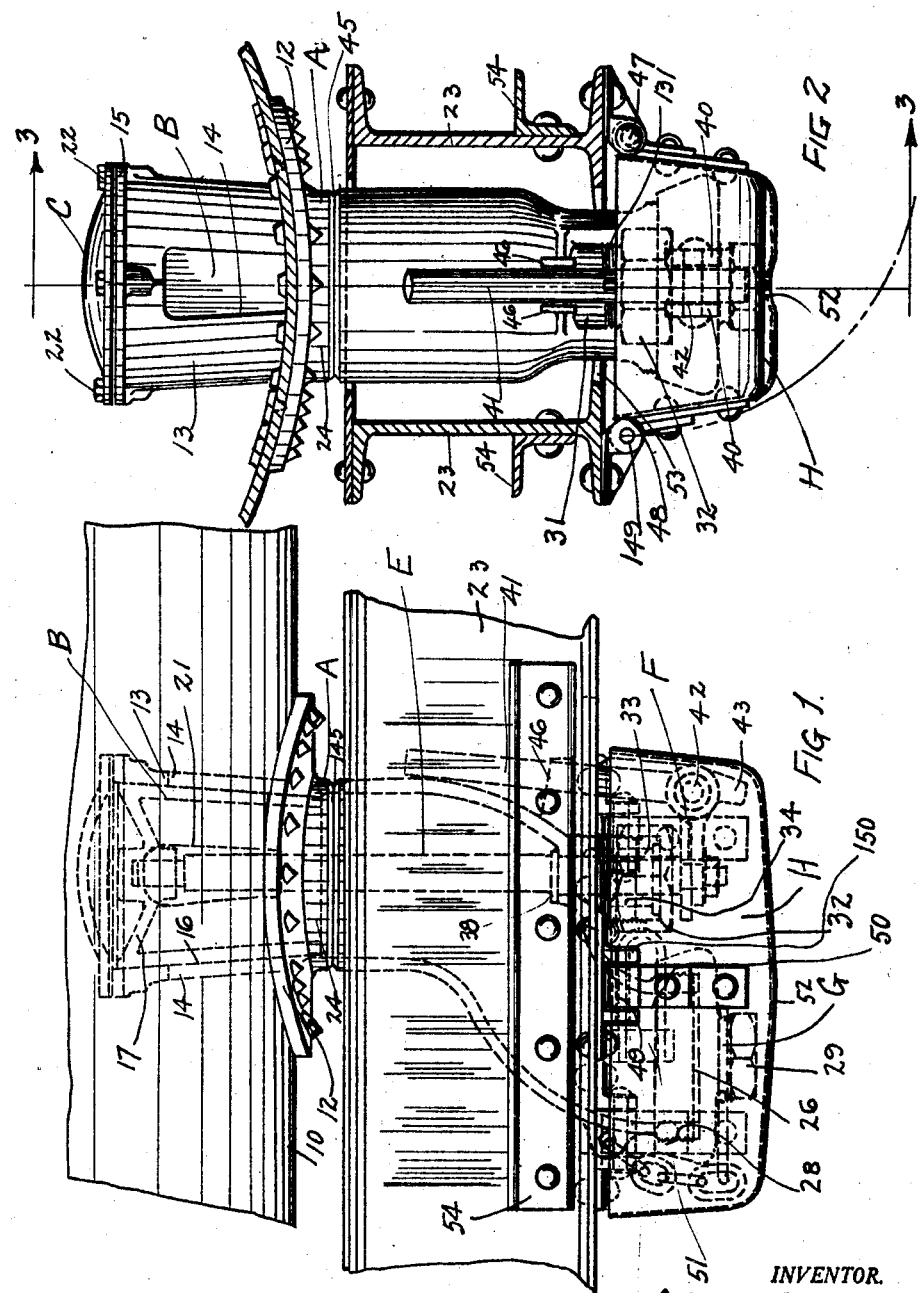
INVENTOR.
ARGYLE CAMPBELL
BY George I Haight
HIS ATTORNEY Dec. 1, 1925.

A. CAMPBELL 1,563,554

TANK VALVE MECHANISM

Filed Sept. 12, 1924      3 Sheets-Sheet 2

INVENTOR.
ARGYLE CAMPBELL
BY George D Haight
HIS ATTORNEY

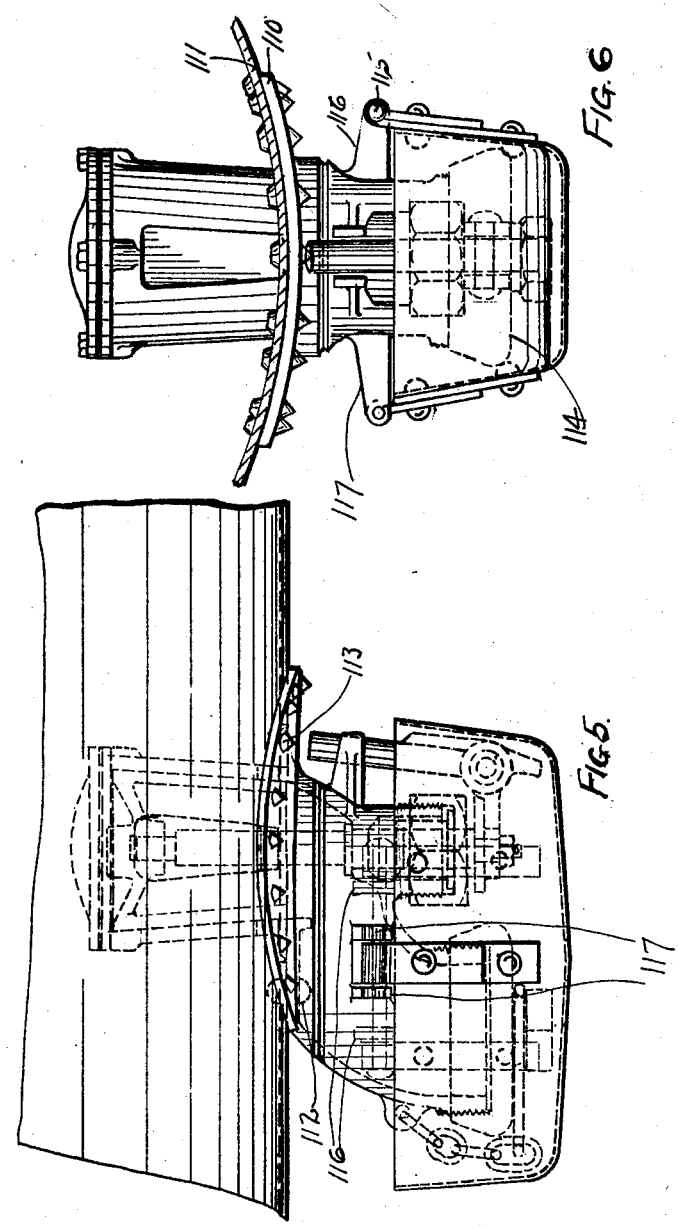

Patented Dec. 1, 1925.

1,563,554

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

TANK-VALVE MECHANISM.

Application filed September 12, 1924. Serial No. 737,344.

*To all whom it may concern:*

Be it known that I, ARGYLE CAMPBELL, a citizen of the United States, residing at Chicago, in the county of Cook and State of Illinois, have invented a certain new and useful Improvement in Tank-Valve Mechanisms, of which the following is a full, clear, concise, and exact description, reference being had to the accompanying drawings, forming a part of this specification.

My invention relates to improvements in tank valve mechanisms.

An object of my invention is to provide valve mechanism especially adapted for railway tank cars and more particularly such a mechanism which is safe and convenient to operate from the exterior of the tank and which is protected from breakage and may be secured against unauthorized manipulation.

A further object of the invention is to provide an outlet for the discharge of the contents of the car which will be disposed in close proximity to the operating means for the valve mechanism and yet be independent of the same, permitting the operator to apply or remove a hose from the outlet pipe without danger of turning the valve.

Other objects of the invention will more clearly appear from the description and claims hereinafter following.

Figure 4:
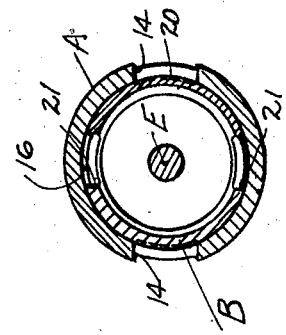
Figure 3:
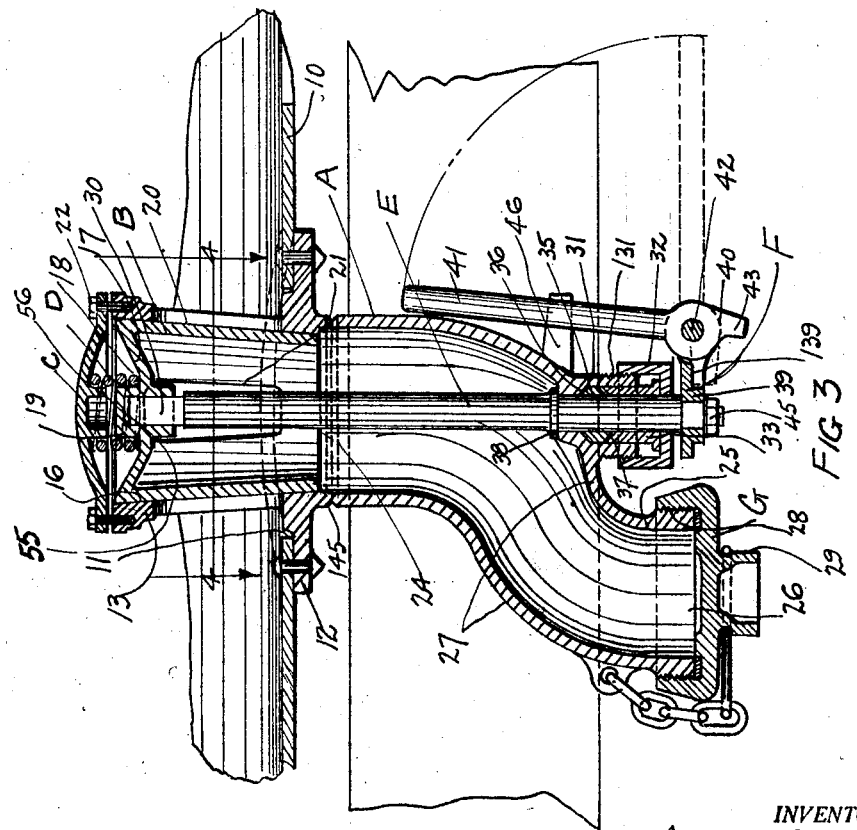

In the drawings forming a part of this specification, Fig. 1 is a side elevational view of a portion of a tank car showing my improvements in connection therewith. Fig. 2 is a vertical transverse partial sectional view of the construction shown in Fig. 1. Fig. 3 is a vertical sectional view of the arrangement shown in Fig. 1, taken substantially on the line 3—3 of Fig. 2. Fig. 4 is a sectional view taken through the valve on a line corresponding substantially to the line 4—4 of Fig. 3. Fig. 5 is a side elevational view of a portion of a car showing a slightly different embodiment of my invention suitable for application to a particular car construction. Fig. 6 is an end view, partly in section and partly in elevation of the invention as shown in Fig. 5.

In said drawings 10 denotes the bottom sheet of the tank, the same having an opening 11 therein to provide for the tank valve mechanism. In carrying out my invention I employ a main body portion which may be termed an outlet chambered member A; a valve member B; a cap C disposed on the member A and above the member B; a spring D; a valve operating stem or rod E; valve rotating means F; a closure G; and a pivotally mounted enclosing member H adapted to enclose the depending parts of the valve.

The body member A is preferably in the form of a casting of suitable material and has an arcuate flange 12 adapted to fit the underside of the tank 10 and be rigidly secured thereto as by welding or riveting or other suitable means. Said member A is provided with a cup-shaped section 13 of cylindrical form which is extended inwardly through the opening 11 of the tank sheet within the tank itself. Said cup-like section 13 is formed with open ends and has the side wall provided with diametrically opposed outlet ports 14—14. A flange 15 extends around the upper outer edge of the section 13 and the inner side of the said section is preferably machined to provide a tapered conical valve seat 16.

Co-operable with said valve seat 16 is the hollow, truncated cone valve member B, with the top wall 17 downwardly cupped to provide a recess 18, and within this recess is disposed an upwardly extending boss 19 for the purpose of centering the spring D, as will be more fully pointed out hereinafter. The outer wall 20 of the member B is tapered as indicated to form a valve which is adapted to cooperate with the correspondingly tapered valve seat 16. The wall 20 of the member B is also provided with diametrically opposed ports 21—21 which, when the valve is closed, are out of alignment with the ports 14, as shown in Fig. 4, but are adapted to be brought into register with the ports 14 by rotating the member B, as will be understood. The member B is adapted to be forced into tight engagement with the member A so as to effect a tight closure when the member B is in closed position, and for this purpose the coiled expansible spring D is disposed between the wall 17 of the member B and the cap C and normally urges the member B inwardly into the cup-shaped section 13 ensuring a tight joint. The cap C is maintained in position by a plurality of cap screws 22 adapted to be screwed into the flange 15 of the member A.

The body portion of member A is extended downwardly between the car center sills 23—23 and is formed near the flange 12 with a portion 24 of tubular formation. Said portion 24, after extending downwardly a limited distance, gradually enlarges and extends to one side of the valve and merges with a tubular portion 25 having an outlet opening 26 which is disposed out of alignment with the valve portion, thereby giving the effect of two tubular shaped sections 24 and 25 connected by a curved offset 27 forming a conduit adapted to deflect the discharging flow from a vertical path. At its outer end the portion 25 is exteriorly threaded as indicated at 28 to receive the closure G, the latter having a depending portion of squared or polygonal section 29 adapted to receive a wrench or suitable tool for applying and removing it.

Rotation of the valve B is effected from the exterior of the member A by means of the shaft or stem E which is non-rotatably connected with the valve, preferably by having the stem formed with its upper end 30 squared or of a polygonal section adapted to register with a similarly shaped recess in the valve member B. The stem E is extended downwardly through the member A and through the lower wall of the offset portion 27, which is formed of suitable shape to permit of the stem extending therethrough, and at the projecting portion of the stem there is mounted the valve operating means F. At the point where the stem passes out of the body of the member A there is formed integrally therewith a nipple 31, which extends downwardly for a limited distance, said nipple being externally threaded as at 131 to receive a gland nut 32, which latter bears against a gland 33, the interior of the nipple presenting a chamber 34 adapted to receive the gland 33 and packing material 35. The packing material 35 is interposed between the wall of the body A which has a tapered seat adjacent the top of the chamber 34, as indicated at 36, and the wall 37 of the gland which is also oppositely tapered as indicated, thereby making provision for effective compression of the packing material 35, and assuring a leak-proof joint. The stem E is provided with a shoulder 38 adapted to engage with the interior wall of the body portion and thus prevent the stem from shifting downwardly.

The shaft rotating means F, in a preferred form, includes a bracket portion 39 fixedly mounted on the end of the stem E, said bracket having vertically extending jaws 40—40 spaced apart a sufficient distance to receive a pivoted lever 41, said lever being pivotally mounted at 42 to swing upwardly, but limited in its downward movement by having an extension 43 formed therewith and adapted to engage the face 139 of the bracket 39 when the lever 41 is in a substantially horizontal plane. When the lever 41 is in horizontal operative position as indicated by dotted lines in Fig. 3, the extension 43 fits snugly between the jaws 40—40, thereby relieving the pivot 42 of undue strain.

A preferred manner of mounting the bracket 39 on the stem is to provide a perforation of non-circular shape, preferably square, in the said bracket and adapt the same to register with the correspondingly shaped end of the stem E, and retain the parts in engagement by a nut 45 disposed on the end of the stem. When the valve is in closed position the lever 41 may be swung upwardly as indicated in full lines in Fig. 3 and assume a position between lugs 46—46, preferably formed integrally with the body member A, thereby positively locking the valve in closed position.

The disposition of the offset 27 in the conduit leading from the valve to the outlet thus provides a suitable space for the reception of the valve operating means adjacent to, but independently of, the outlet, such construction thereby providing an unusually compact mechanism, which is readily accessible and in full view of the operator.

Intermediate the operating means F and the valve B there is formed in the body member A a groove or notch 145 providing for reduced sectional area in the wall of the body to ensure breakage at this point in the event of a derailment of the tank car. Inasmuch as there is only a loose connection between the top of the stem E and the valve B, breakage of the body member A in the manner referred to automatically disconnects the shaft operating means from the valve proper and the lower portion of the body A with the operating means F falls, leaving the valve in closed position, and consequent danger of leakage is eliminated.

Pivotally mounted to one side of the valve as indicated at 47 there is provided the pivoted cover H, (see Figs. 1 and 2). Said cover is in the form of a pan adapted to enclose both the closure and the operating means F, and also to lock the lever 41 in an inoperative position between the lugs 46—46. The swinging edge 48 of the cover is provided with a bracket 50 having an opening 49 adapted to register with two similar openings 149 formed in brackets 150 carried by the sills 23 so that all three openings are adapted to accommodate the hasp of a padlock 51, or other suitable sealing device. The disposition of the cover in the manner shown, besides preventing malicious tampering with the valve and associated parts, effectively protects the depending portions of the outlet mechanism from blows and the weather. A drainage hole 52 is provided in the lower wall of the cover.

In order to accommodate the depending portion of the valve, the lower flanges of the center sills 23—23 are cut away for a limited distance as indicated at 53 and to compensate for this cut, reinforcing angles 54 are disposed on each side of the center sill.

Assuming the valve is closed and the parts positioned as in Figs. 1 and 2, the operation to discharge the contents of the car is as follows: The operator first releases the cover H which swings downwardly by its own weight; then removes the closure G and couples the hose or discharge pipe to the threaded portion 28 of the tubular portion 25. The lever 41 having been brought to a horizontal position, the same is given a quarter turn thereby moving the valve to the fully open position.

In tank cars of this nature it is a matter of frequent occurrence to have the valve stick, due largely to the various kinds of viscous materials transported. In such an event with the construction provided herein, the operator taps on the lower end of the stem E smartly and forces the end 55 of same against the wall 56 of the member B, moving the latter momentarily upward a slight distance, thereby facilitating the rotation of the valve. The surfaces 55 and 56 are normally slightly separated in order to compensate for irregularities of manufacture and to provide adjustment as the parts become old and worn.

The embodiment of the invention shown in Figs. 5 and 6, is very similar to that heretofore described, and a detailed description of the same is thought to be unnecessary. Such a construction is particularly used for tank cars without center sills and the variations in design are made to suit the altered condition. As will be seen by reference to the drawing the valve includes a flanged body member 110 similar to the portion A, except that it is considerably shortened, and such member is riveted to the tank 111 inwardly as shown at 112, and outwardly at 113. The cover 114 is pivotally supported at 115, from lugs 116 formed integrally with the body portion 110, and the swinging edge of the cover is adapted to be supported from lugs 117 formed integrally with the body portion. Except for the variation noted this embodiment of the invention is identical with the portion H, and the various parts associated therewith, all of which construction has been heretofore described in detail.

I have herein shown and described what I now consider to be the preferred manner of carrying out the invention, but the same is merely illustrative, and I contemplate all changes and modifications that come within the scope of the claims appended hereto.

What I claim is:

1. In a tank valve mechanism, the combination with a hollow chamber member having a rotatable valve disposed therein, an operating element passing through the chamber and adapted to have rotary movement in unison with the valve, said element being also bodily movable from the exterior of the chamber to induce a movement of the valve in a plane at an angle to its plane of rotation, said valve being maintained in operative position independently of said operating element.

2. In a valve mechanism for tanks having an outlet opening, the combination with a main body member having a discharge passageway therethrough and a discharge opening at the bottom; of a removable closure cap for said discharge opening; valve means controlling the discharge through said passageway; actuating means for said valve means, said actuating means including an operating element disposed exteriorly of said body member, said element being movable from operative to inoperative position; and a displaceable cover arranged, when in operative position, to cover and protect both said cap and element and also to maintain said element in its inoperative position.

3. In a valve mechanism for tanks having an outlet opening, the combination with a main discharge member secured to the tank and having a discharge passage therethrough; of a rotatable valve for controlling the discharge through said passage; and means for effecting rotation of said valve, said means including a stem rotatable in unison with said valve and extended exteriorly of said main member, said stem having also limited movement axially from its normal position toward the valve, the latter and said stem having co-operable shoulders engageable upon limited axial movement of said stem, whereby said stem may be actuated from the exterior of said member to loosen the said valve from its seat.

4. In a tank car, the combination with the body thereof; of a tank valve mechanism including a body portion having a valve retained for operation within the tank, and valve actuating mechanism disposed exteriorly of the tank, said body member having a conduit leading away from the valve and terminating in a discharge opening at one side of the actuating mechanism, said actuating mechanism being detachably mounted with respect to said valve.

5. In a tank car, the combination with the body thereof; of a valve member having a tapered valve cage disposed within the car body; a conduit of offset construction located exteriorly of the tank and terminating in a discharge opening; a tapered rotatable valve co-operable with the valve cage; resilient means for forcing the valve into engagement with the valve cage; valve operating mechanism disposed exteriorly of the conduit; and a valve stem connecting with the valve mechanism and extending within the conduit for rotating said valve.

6. In a tank car, the combination with the body thereof; of a tank valve mechanism including a body member contained partly within the car body, and extending without the car body; a rotatable valve contained within the car body; valve actuating mechanism disposed exteriorly of the car body, said valve actuating mechanism being adapted to rotate about the center of rotation of the valve, said body member having a conduit leading away from the valve and terminating in an opening at one side of the actuating mechanism, said conduit being provided with a weakened portion intermediate the valve actuating mechanism and the valve; and a valve stem carried by the actuating mechanism and detachably connected with said valve.

7. In a tank car, the combination with the body thereof; of a tank valve mechanism comprising valve supporting means disposed within said tank, and including a conduit extending exteriorly of said tank; a valve retained by said supporting means; and valve actuating means associated with the exterior portion of said conduit and detachably connected with said valve.

8. In a tank car, the combination with the body thereof; a tank valve mechanism comprising valve supporting means disposed within the tank and converging outwardly, said valve supporting means having associated therewith a conduit terminating exteriorly of said tank; a tapered valve operatively associated with said supporting means and retained thereby; and means for actuating said valve, said actuating means being disposed exteriorly of said tank and detachably connected with said valve.

9. In a tank car, the combination with the body thereof; a tank valve mechanism comprising valve supporting means disposed within the tank and converging outwardly, said valve supporting means having associated therewith a conduit communicating with the exterior of said tank; a tapered valve operably associated with said supporting means and retained thereby; and an operating element associated with said valve, said element being mounted for rotary movement in unison with the valve, said element being also axially movable from the exterior of the tank to induce a movement of the valve in a plane at an angle to its plane of rotation.

10. In a tank car, the combination with the body thereof; of a tank valve mechanism comprising valve supporting means disposed within said tank and having a conduit extending exteriorly of said tank; a valve retained by said supporting means; and valve actuating means associated with the exterior portion of said conduit, said valve actuating means including an operating element arranged to impart rotary movement in unison with the valve, said element being also axially movable to induce a movement of the valve in a plane at an angle to its plane of rotation.

In witness that I claim the foregoing I have hereunto subscribed my name this 8th day of September, 1924.

ARGYLE CAMPBELL.